US011611497B1

(12) United States Patent
Manikanta et al.

(10) Patent No.: US 11,611,497 B1
(45) Date of Patent: Mar. 21, 2023

(54) SYNTHETIC WEB APPLICATION MONITORING BASED ON USER NAVIGATION PATTERNS

(71) Applicant: Cisco Technology, Inc., San Jose, CA (US)

(72) Inventors: Sudeep Rao Vadlaputi Manikanta, Mumbai (IN); Karthikeyan P. Ramasamy, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/494,020

(22) Filed: Oct. 5, 2021

(51) Int. Cl.
  *G06F 15/16* (2006.01)
  *H04L 43/0817* (2022.01)
  *H04L 67/02* (2022.01)
  *H04L 43/0876* (2022.01)
  *H04L 67/561* (2022.01)

(52) U.S. Cl.
  CPC ...... *H04L 43/0817* (2013.01); *H04L 43/0876* (2013.01); *H04L 67/02* (2013.01); *H04L 67/561* (2022.05)

(58) Field of Classification Search
  CPC .............. H04L 43/0818; H04L 43/0876; H04L 67/561; H04L 67/02
  USPC ....................................................... 709/224
  See application file for complete search history.

(56) References Cited

U.S. PATENT DOCUMENTS

| | | | | |
|---|---|---|---|---|
| 10,536,363 | B2 * | 1/2020 | Sommer | H04L 43/50 |
| 10,657,032 | B2 * | 5/2020 | Funnell | G06F 11/3672 |
| 10,846,193 | B2 * | 11/2020 | Lackner | G06F 11/3438 |
| 11,182,537 | B2 * | 11/2021 | Lackner | G06F 40/14 |
| 11,329,899 | B2 * | 5/2022 | Stavisski | H04L 63/0227 |
| 2005/0278703 | A1 * | 12/2005 | Lo | H04L 41/5009 717/169 |
| 2006/0020923 | A1 * | 1/2006 | Lo | H04L 41/142 714/E11.197 |
| 2006/0020924 | A1 * | 1/2006 | Lo | H04L 41/5032 717/124 |

(Continued)

OTHER PUBLICATIONS

"Selenium (Branch with QtWebDriver", online: https://developer.cisco.com/codeexchange/github/repo/cisco-open-source/selenium/, accessed Jun. 9, 2021, 7 pages.

(Continued)

*Primary Examiner* — Moustafa M Meky
(74) *Attorney, Agent, or Firm* — Behmke Innovation Group LLC; James M. Behmke; Jonathon P. Western (57) ABSTRACT

In one embodiment, an illustrative method herein comprises: receiving, at a device, a plurality of captured end-user navigation sessions for a monitored application; generating, by the device, a mapping of end-user workflows for the monitored application based on an aggregation of the plurality of captured end-user navigation sessions; determining, by the device, one or more particular end-user workflows from the mapping of end-user workflows for synthetic testing; generating, by the device, one or more synthetic scripts that traverse the one or more particular end-user workflows respectively; and sharing, by the device, the one or more synthetic scripts with a synthetic monitoring system to cause the synthetic monitoring system to synthetically test the monitored application using the one or more synthetic scripts to traverse the one or more particular end-user workflows.

20 Claims, 7 Drawing Sheets

(56) References Cited

U.S. PATENT DOCUMENTS

| | | |
|---|---|---|
| 2011/0029681 A1 | 2/2011 | Lee et al. |
| 2011/0161395 A1 | 6/2011 | O'Donnell, III et al. |
| 2017/0339042 A1* | 11/2017 | Sommer ................. H04L 67/02 |
| 2019/0171542 A1* | 6/2019 | Lackner .............. G06F 11/3006 |
| 2019/0171543 A1 | 6/2019 | Lackner et al. |
| 2019/0303274 A1* | 10/2019 | Funnell ............... G06F 11/3696 |
| 2020/0089596 A1 | 3/2020 | Barbee et al. |
| 2021/0067422 A1* | 3/2021 | Stavisski ............ H04L 63/0227 |

OTHER PUBLICATIONS

"AppPulse Active Synthetic Monitoring Tools", online: https://www.microfocus.com/en-us/products/synthetic-monitoring/overview, accessed Jun. 9, 2021, 7 pages.

"AppPulse Active", Data Sheet, online: https://www.microfocus.com/media/data-sheet/apppulse_active_ds.pdf, accessed Jun. 9, 2021, 4 pages, Micro Focus.

\* cited by examiner

SYNTHETIC WEB APPLICATION MONITORING BASED ON USER NAVIGATION PATTERNS

TECHNICAL FIELD

The present disclosure relates generally to computer systems, and, more particularly, to synthetic web application monitoring based on user navigation patterns.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, synthetic monitoring has become an industry standard for monitoring web applications by providing information on the critical business transactions and the common paths of the application. This information can help detect if there are performance degradations in the website and what are the possible causes for it. This monitoring technique uses recorded scripts of key user transaction workflows with the web/API endpoints and tests them, typically using "agents" deployed in multiple locations.

Writing such scripts, however, requires an immense understanding of the web application, web frameworks, and other technical knowledge. These scripts can only be written by doing a lot of research on the way the users use the web application. Maintaining such scripts is also difficult because they need to be re-written frequently as the web application evolves. Also, monitoring the website for different locations might require different scripts, because websites might sometimes show up differently in different regions.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein comprises: receiving, at a device, a plurality of captured end-user navigation sessions for a monitored application; generating, by the device, a mapping of end-user workflows for the monitored application based on an aggregation of the plurality of captured end-user navigation sessions; determining, by the device, one or more particular end-user workflows from the mapping of end-user workflows for synthetic testing; generating, by the device, one or more synthetic scripts that traverse the one or more particular end-user workflows respectively; and sharing, by the device, the one or more synthetic scripts with a synthetic monitoring system to cause the synthetic monitoring system to synthetically test the monitored application using the one or more synthetic scripts to traverse the one or more particular end-user workflows.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
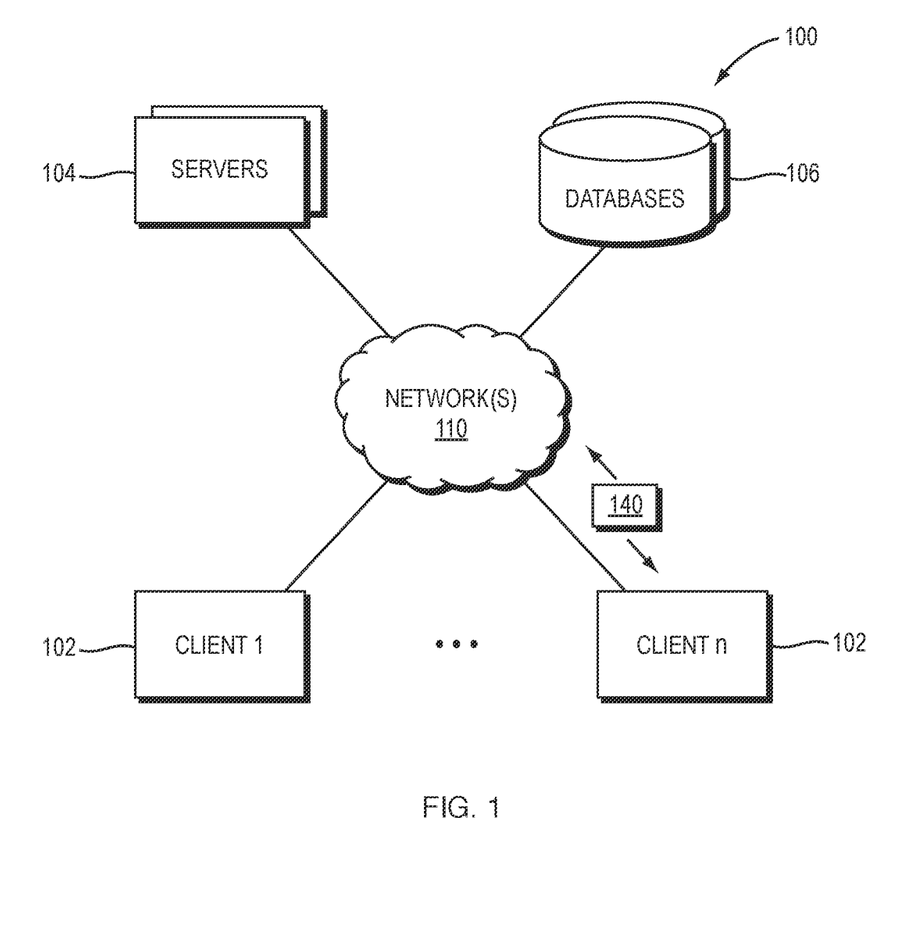
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
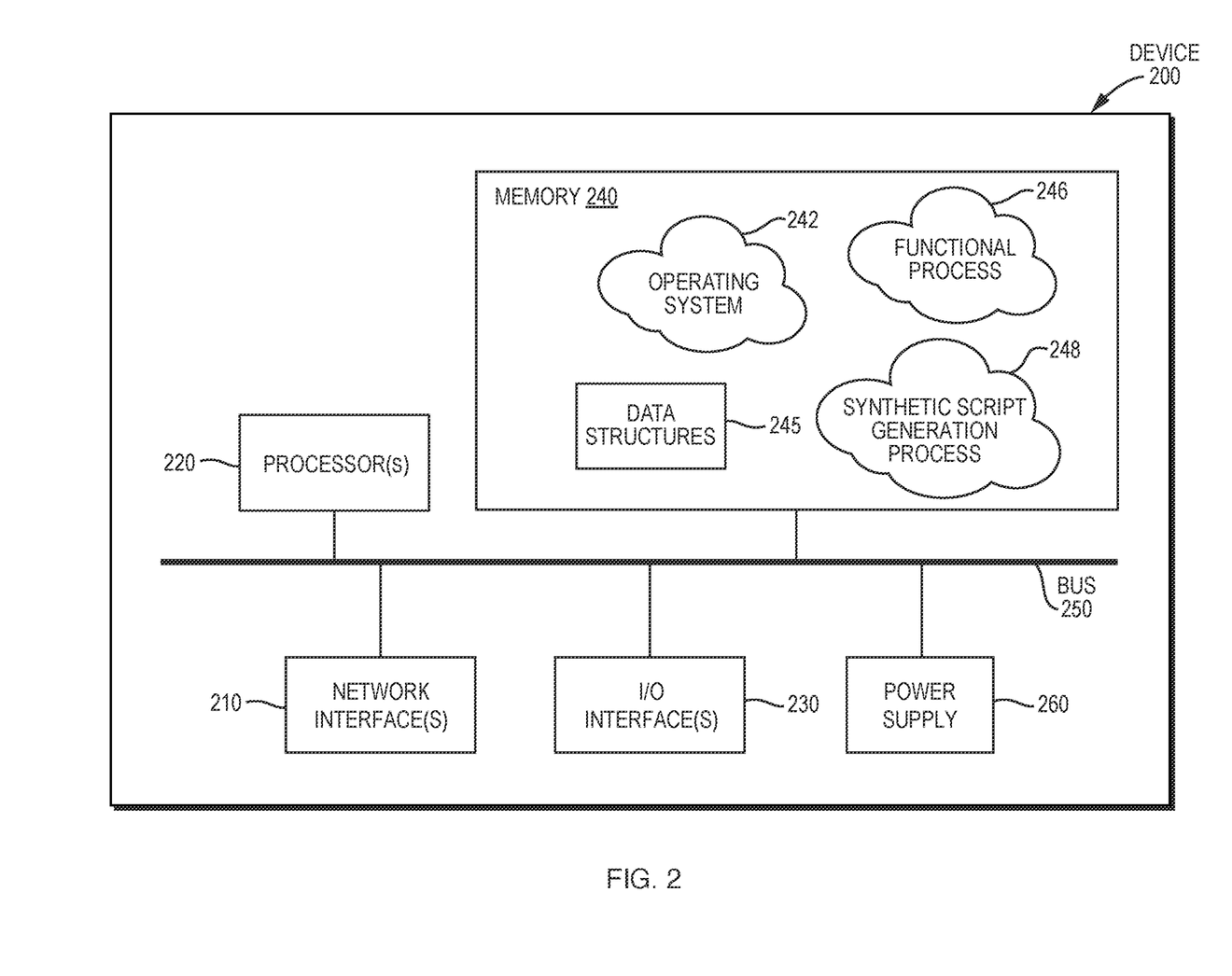
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "synthetic script generation" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
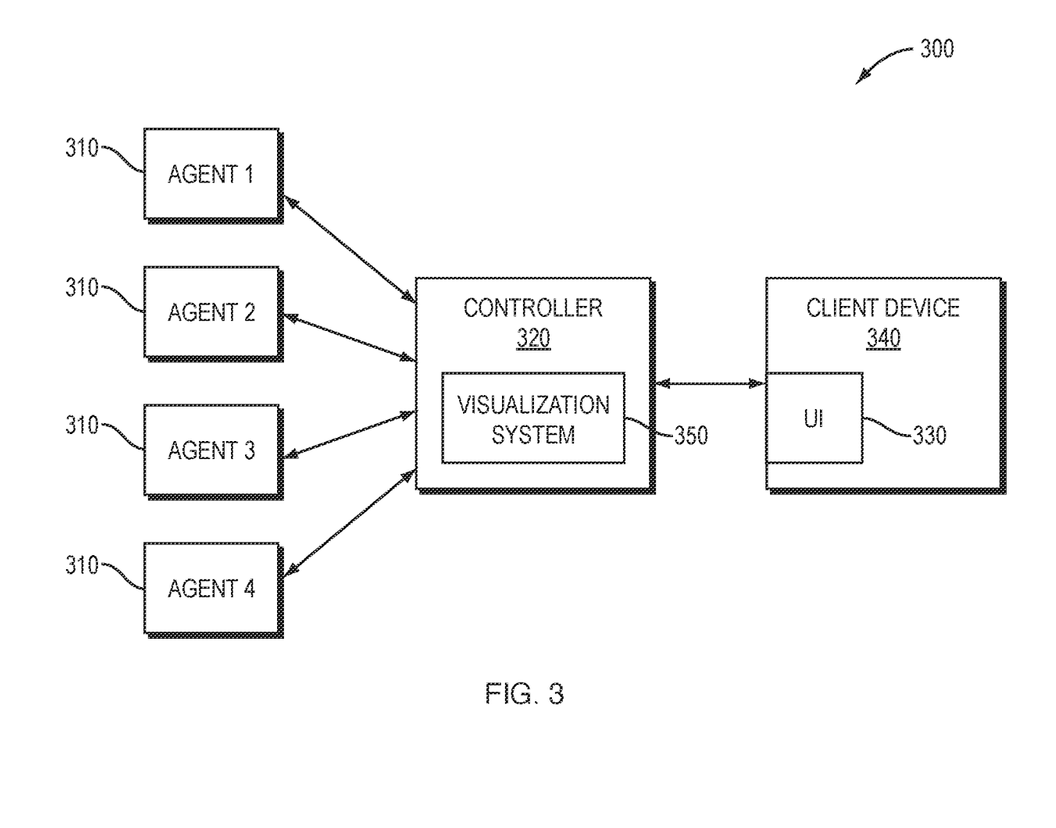
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Synthetic Web Application Monitoring Based on User Navigation Patterns—

Today, web applications have a global user base. These web applications are hosted on servers in multiple locations to provide a similar experience to the end-users. These web applications could sometimes run into performance issues due to diverse factors such as a slow database, lack of CPU/memory, network issues, etc., and thus spoil the experience of the end-users. These performance issues have to be addressed as soon as possible, to reduce the impact on the end-users, and in turn the business. A very popular monitoring technique called "synthetic user monitoring" is used in such cases to quickly identify performance issues in different locations.

In particular, as noted above, synthetic monitoring traditionally uses recorded scripts of key user transaction workflows with the web/API endpoints and tests them using "agents" deployed in multiple locations. These "agent" components, that are installed on computers in different locations, act and perform actions as a user from a particular location for the web-based server and collects performance metrics of the server transactions. This monitoring technique provides a way to capture server performance baselines from an end-user perspective, and thus help catch performance degradations for a given endpoint at the same time.

As also noted above, however, writing such scripts is very difficult and requires significant time, skills, and resources. That is, these scripts require strong technical knowledge, a good grasp of the web application, and a good understanding of the different elements in their web applications to write. Moreover, these scripts require an enormous effort to maintain since they need to be changed as the web application evolves, forcing continual rewrites to keep up with any updates. Furthermore, different scripts may need to be written for different locations to account for regional differences in the web application, multiplying the number of maintained scripts required for globally monitored systems. Still further, manual research and analysis of the most used navigation patterns by the end-users of web applications is also required to ensure that the scripts actually cover most of the workflows.

The techniques herein, therefore, provide synthetic web application monitoring based on user navigation patterns, specifically by using real user navigation patterns on the web application to generate synthetic test scripts (for proactive monitoring/synthetic user monitoring). In particular, customers of an observability intelligence platform, such as the one described above, will be able to easily generate synthetic monitoring scripts for the web applications while ensuring that substantially all of the user paths of their website are monitored, particularly for the most commonly used end-user navigation workflows, due to the auto-generation of synthetic scripts for user paths not currently covered by synthetic monitoring, as described in greater detail below.

Specifically, according to one or more embodiments described herein, an illustrative method herein may comprise: receiving a plurality of captured end-user navigation sessions for a monitored application; generating a mapping of end-user workflows for the monitored application based on an aggregation of the plurality of captured end-user navigation sessions; determining one or more particular end-user workflows from the mapping of end-user workflows for synthetic testing; generating one or more synthetic scripts that traverse the one or more particular end-user workflows respectively; and sharing the one or more synthetic scripts with a synthetic monitoring system to cause the synthetic monitoring system to synthetically test the monitored application using the one or more synthetic scripts to traverse the one or more particular end-user workflows.

Figure 4:
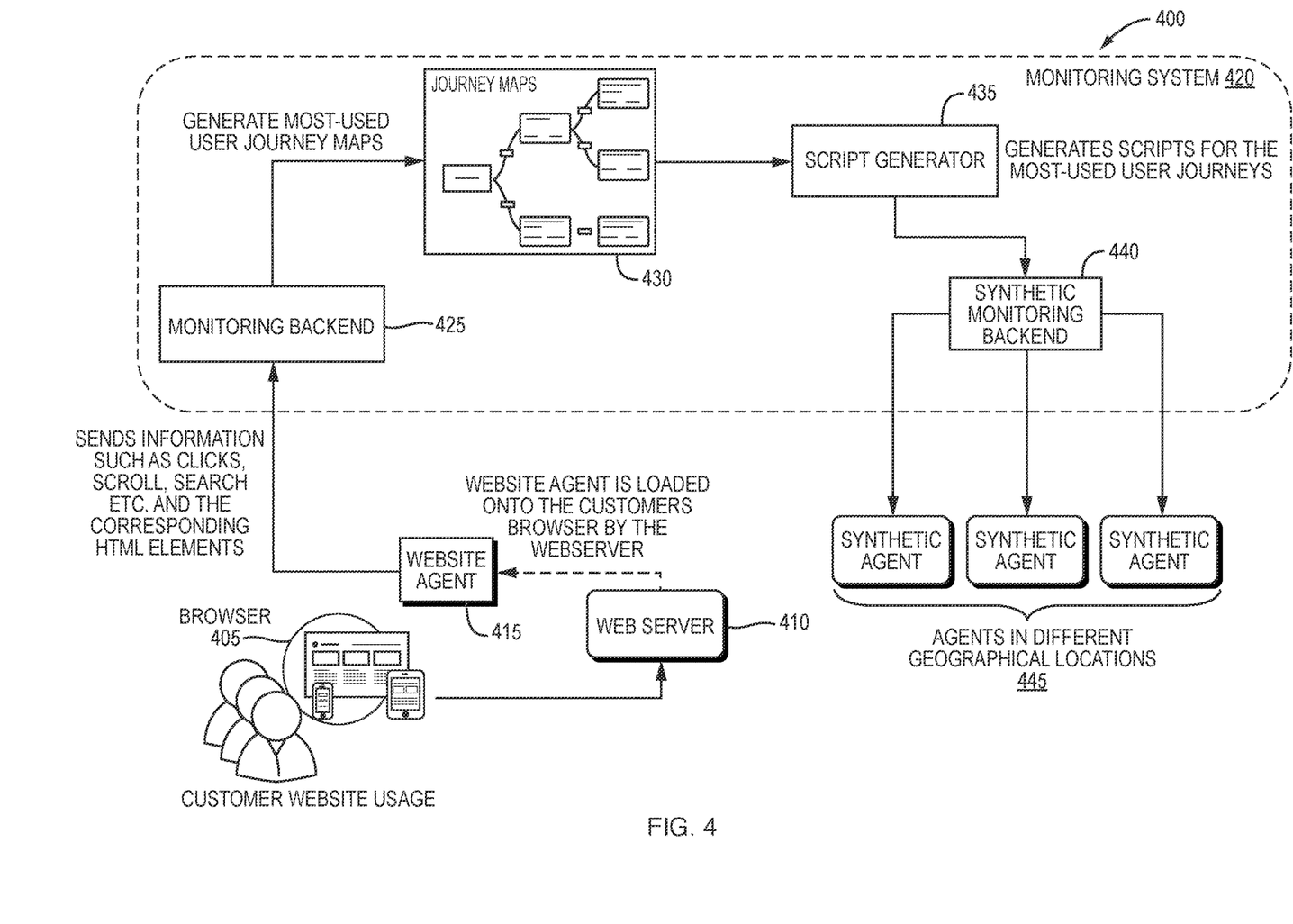
FIG. 4 illustrates an example system and workflow for synthetic web application monitoring based on user navigation patterns.

Operationally, and with reference to FIG. 4, the techniques herein focus on collecting the meta-data of real user actions on an application, particularly a web page, though other online, mobile, or desktop applications ("apps") may also benefit from the techniques herein. In particular, as described herein, real user/human user actions across the globe are recorded by the system herein (e.g., local agents) which will pass the usage information to a cloud-based monitoring backend.

In detail, the system 400 herein is illustratively based on a user of a customer application (e.g., website) directing their browser 405 to a web server 410 to access the application to be monitored. A website/JavaScript agent 415 component may be loaded onto the browser 405 of the end-users when they access the web application through the internet (web server 410). That is, customers desiring access to the techniques herein may include the corresponding client script/agent 415 as a part of their application/webpage, which will enable the collection of the information herein.

This website/JavaScript agent 415 then collects information on the different transactions such as clicks, scrolls, double clicks, keydowns, keyups, text inputs (searches, forms, etc.), etc. that the end users make with the application (e.g., hundreds or thousands of users of a website from across the globe) along with the corresponding HTML elements, and sends the information to the monitoring system 420. Illustratively, this information is referred to as metadata, such as the web element ID/XML Path ("XPath") and action type (type/select), or other data that a system may use to follow a user's journey through an application. The monitoring backend 425, in particular, collects these "user navigation sessions" for a plurality of distributed end-users of the application (e.g., many users from around the world), and generates user journey maps 430 based on the traversal of the users through portions of the application, as described below. As also described in greater detail below, these journey maps 430 may be used by a script generator 435 to generate scripts for the user journeys (e.g., the most-used as shown, all, only those not previously being tested, etc.), which may be sent to a synthetic monitoring backend 440 for distribution to synthetic agents 445, which may be found throughout different geographical locations.

Note that the components of the monitoring system 420 may be separate devices, separate components of a single device, separate systems under separate ownership, and so on, and the view shown herein is merely one example for illustration. As used herein, the terms "controller", "system", "device", etc., may imply a singular entity, multiple entities, a singular process, multiple processes, and so on based on implementation and configuration.

Figure 5:
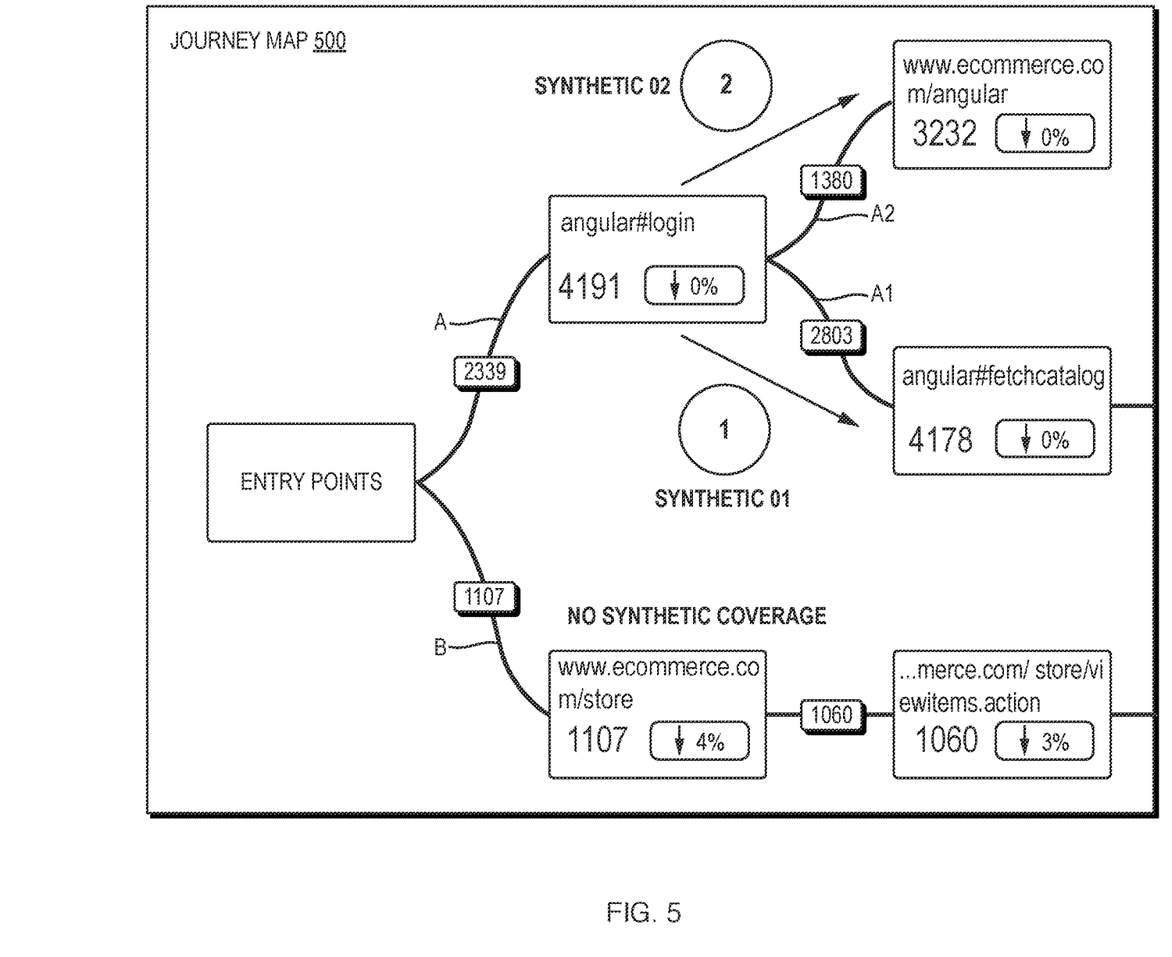
FIG. 5 illustrates an example journey map for synthetic web application monitoring based on user navigation patterns.

With reference to FIG. 5, the techniques herein determine a "journey map" 500 that outlines the possible workflows/paths that a user could take through the monitored application. That is, the monitoring backend above detects the end-user paths (e.g., A-A1, A-A2, B, etc.) for the application using the different user sessions (e.g., from a given location and time frame), which is configurable to generate a map of the determined navigation patterns of the end users as shown. That is, the cloud-based monitoring system constructs a tree of all the meta-data based on the root elements (e.g., webpage ID per tenant) and creates a map (e.g., frequency map) of all such events that happened over time to present the real user paths through the monitored application. Regarding any user-facing user-interfaces associated with the techniques herein, the journey map 500 may be an internally stored data structure for only computer-consumption to generate scripts, or may be graphically displayed for user/admin consumption, and may include various other information, such as numbers/percentages of users on each pathway, URLs associated with the pathways and their branches, selections made to reach each pathway, change or rate of change of users on particular pathways over time, and so on. (The view shown in FIG. 5 is meant for illustration only, and is not meant to be limiting to the information that may or may not be included in the journey map 500.)

Note that in one embodiment, the journey map 500 may be limited to only the "most-used" pathways (e.g., 90% of all users/data) to avoid obscure or uninteresting workflows. For example, though a full-picture of all possibly flows may have hundreds of options, by simply monitoring a smaller number (e.g., three options in the simplified example of FIG. 5, A-A1, A-A2, and B), it is possible to ensure that a minimum threshold (e.g., that 90%) of the usage, and thus of the associated performance (and likely issues) can be captured by the synthetic testing used herein.

In an additional or alternative embodiment, the techniques herein may map the real-user paths against an existing scope of synthetic monitoring tests. That is, as shown in FIG. 5, assume that two synthetic tests are already configured, such as "Synthetic 01" for pathway A-A1 and "Synthetic 02" for pathway A-A2. By using the techniques herein, however, it may be discovered that an additional workflow or workflows may be untested (e.g., pathway B). That is, the techniques herein provide customers the ability to identify the pages and user paths which are missed by previous synthetic monitoring tests (and, as described below, the ability to have such tests auto-generated for such missing paths).

According to embodiments herein, auto-generation of an associated script may be autonomous to complete testing of all untested navigated workflows (or all most-used and untested workflows, or other configurations), or else may be based on an admin selecting a particular pathway for which a script is to be auto-generated. For example, once a decision is made to auto-generate a script, the link of nodes/pages along with their meta-data as collected above will be used to generate a synthetic test. Said differently, on selecting the navigation paths required to be monitored, the script generator component above generates a corresponding synthetic script using the aggregated user session data.

Figure 6:
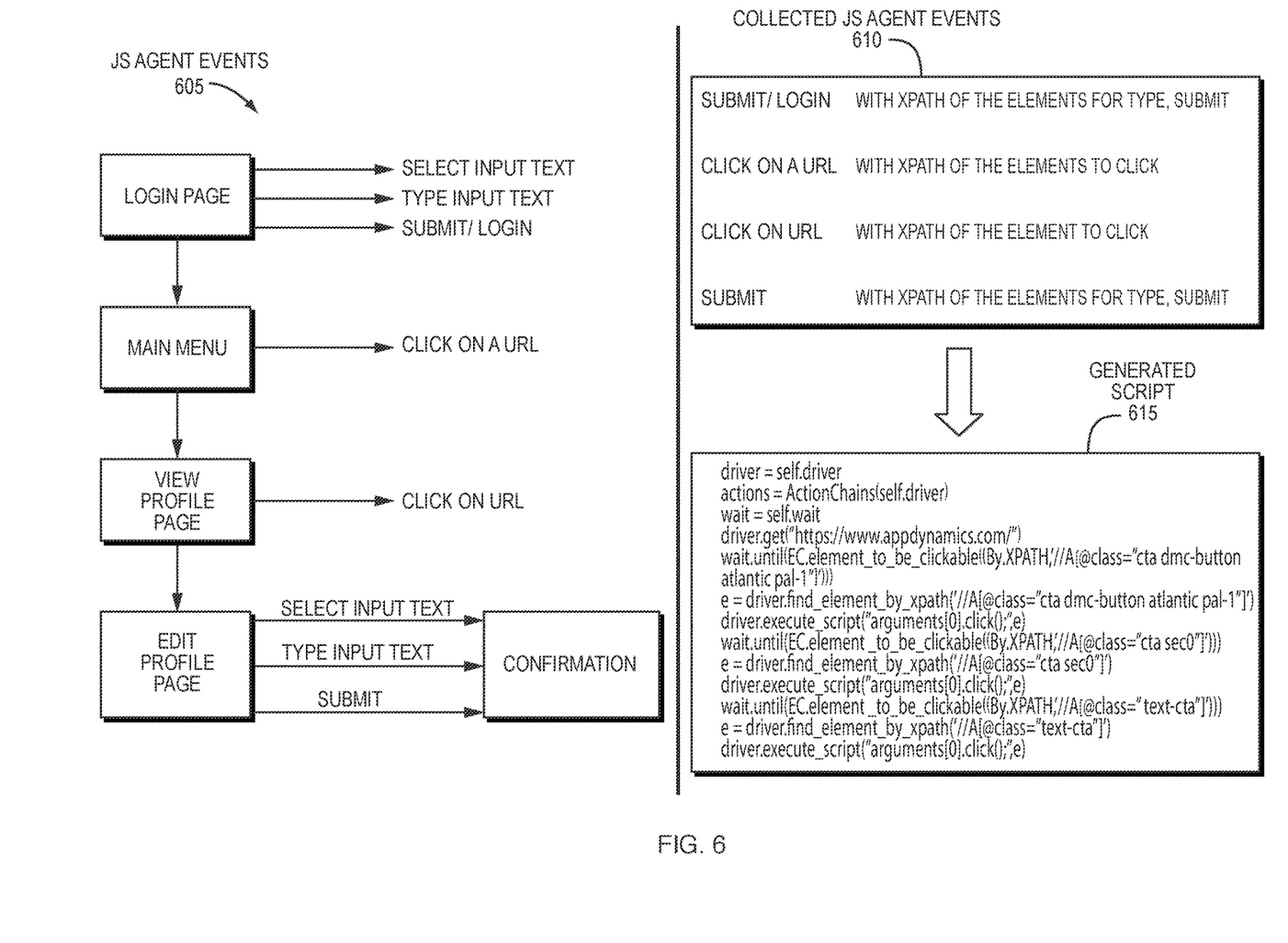
FIG. 6 illustrates an example of synthetic script generation based on user navigation patterns.

FIG. 6 illustrates an example of script generation, where JS agent events 605 are a collection of real user action meta-data (monitored and detected by associated agents 415 above) for individual users, which happens across the globe whenever a user access the monitored application (e.g., a particular website). Here, at the granular level of the application flow (page-level, actions taken, redirects, etc.), the techniques herein thus capture user actions and drill down into specific details. For instance, as shown in the example of FIG. 6, such an illustrative "edit profile" workflow may comprise such things as a login page (e.g., receiving a selection to input text, the typing of the input text, selecting a submit/login button), a main menu (e.g., where a URL can be selected, such as to view a user profile), a subsequent view profile page (e.g., where an "edit profile URL" is illustratively selected), to bring the user to the edit profile page (e.g., where more text may be input) before a "submit" button brings the user to a confirmation page.

According to this workflow, therefore, an illustrative set of collected JS agent events 610 may look something like this:

Submit/Login: with XPath of the elements for type, submit;
Click on a URL: with XPath of the element to click;
Click on URL: with XPath of the element to click; and
Submit: with XPath of the elements for type, submit.

Notably, collection of the meta-data herein may involve only the web element meta-data and not any user-specific sensitive values. That is, for static websites, the techniques herein may simply generate scripts based on the aggregated collection of user navigation, but in the case of dynamic websites (e.g., username/password logins, etc.), the techniques herein may input pre-specified test values (e.g., a pre-supplied test username and password), or may trigger a user-facing automated script generation workflow (e.g., a template with information to be filled in) to allow the system to request such dynamic information as inputs during the auto-generation process. In other words, the system herein may be configured to remove any user-specific dynamic values and offer a template for the user inputs. For example, in the case of a login page, the username and password are dynamics, and so a template can be provided to input the test values needed for the synthetic tests. The benefit here is that the complex parts (XPath, element IDs, etc.) of writing the script are handled and only the dynamic user inputs have to be provided.

Using the generated scripts 615, the corresponding workflows can then be monitored by synthetic monitoring. That is, the synthetic monitoring system (e.g., synthetic monitoring backend 440 above) may run the scripts in the synthetic agents 445 above and collect the data necessary to generate performance baselines, detect errors, detect anomalies, and so on by simulating/emulating real user behavior, accordingly.

Note that the generated scripts may be specifically relevant to particular agents. For instance, in one embodiment, the scripts may be based on specific locations, regions, languages, browsers, browser versions, and so on. As such, the collected data corresponding to such specifics may then generate specifically tailored scripts, accordingly, and thus the agents to which such scripts are sent for testing may be respectively configured/located. For a simplified example, assume that different scripts are generated based on users in North America versus users in Europe. As such, the North American scripts may be sent to North American agents, while the European scripts may be sent to European agents, and so on.

Additionally, the techniques herein may also account for updates in user navigation, which may be caused by version updates to the monitored application (or browser), trends in application usage, seasonal usage patterns, and so on. As such, in one embodiment, the collected information may automatically detect the change in user navigation (new/different workflows, old workflows no longer receiving any usage, etc.), and may corresponding create new/updated scripts, accordingly. Such updates may be also be based on manually triggering the collection of user navigation metadata, such as when a customer releases a new version and wants to detect new pathways and generate new testing scripts using the techniques herein.

Figure 7:
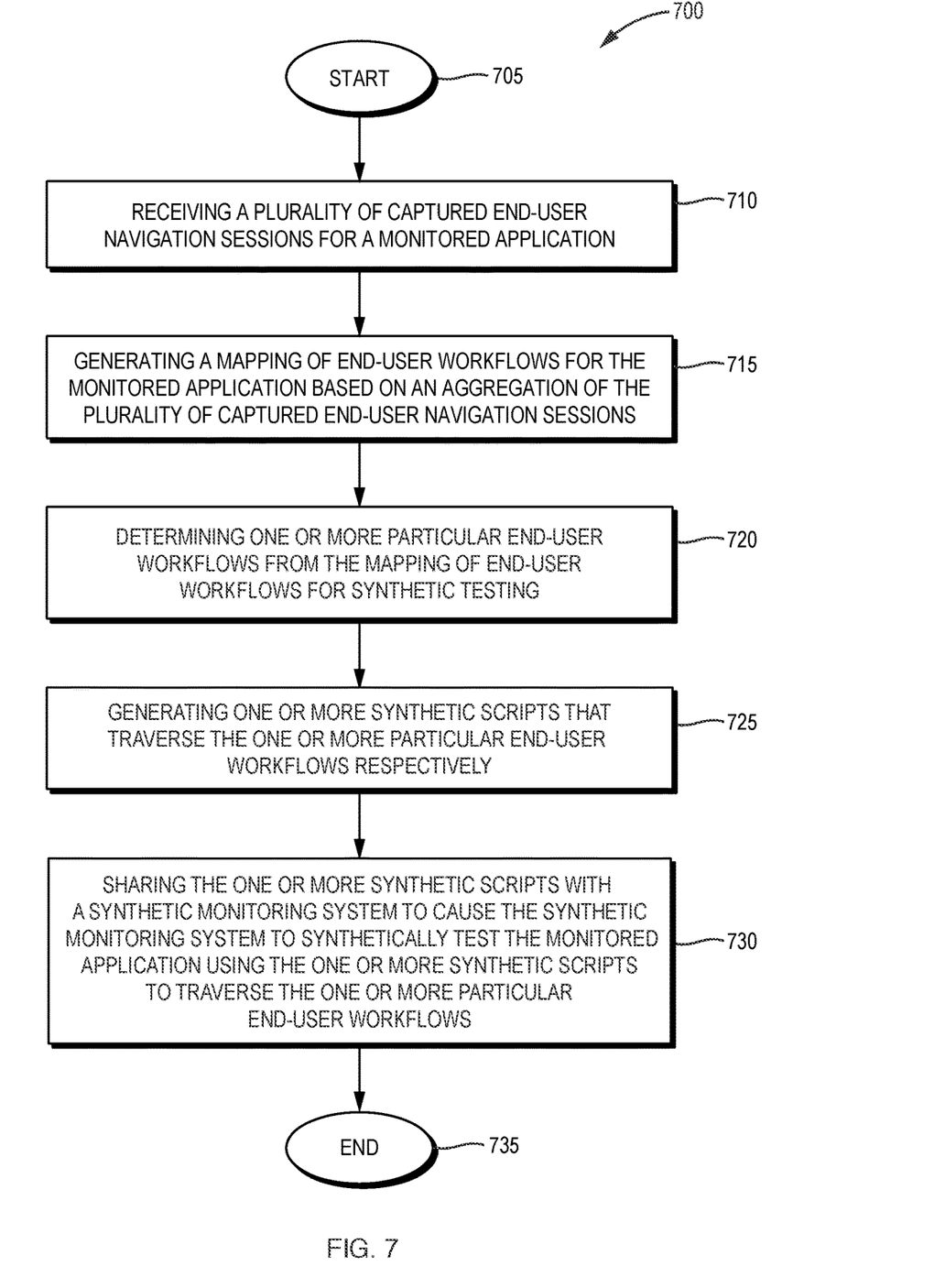
FIG. 7 illustrates an example simplified procedure for synthetic web application monitoring based on user navigation patterns in accordance with one or more embodiments described herein.

In closing, FIG. 7 illustrates an example simplified procedure for synthetic web application monitoring based on user navigation patterns in accordance with one or more embodiments described herein. For example, a non-generic, specifically configured device (e.g., device 200, such as a controller device 320 above) may perform procedure 700 by executing stored instructions (e.g., process 248, such as a synthetic script generation process 248). The procedure 700 may start at step 705, and continues to step 710, where, as described in greater detail above, a plurality of captured end-user navigation sessions for a monitored application (e.g., a website, a web application, a mobile application, a desktop application, etc.) may be received at the device, such as from distributed end-user agents on corresponding end-user web browsers, as mentioned above. Note that as also mentioned above, the plurality of captured end-user navigation sessions may comprise navigation metadata based on web page elements and actions (e.g., based on element IDs, XPath types and actions, etc.), and/or may be based on such things as clicks, scrolls, double clicks, keydowns, keyups, text entry, and so on.

In step 715, the procedure may then generate a mapping of end-user workflows for the monitored application based on an aggregation of the plurality of captured end-user navigation sessions, as detailed above. As such, in step 720, the techniques herein may determine one or more particular end-user workflows from the mapping of end-user workflows for synthetic testing. For instance, as mentioned above, the techniques herein may determine a set of untested end-user workflows, and selects those accordingly. Alternatively (or in addition), the techniques herein may determine a set of most-used end-user workflows, and selects those for synthetic testing. (Note that determining the set of most-used end-user workflows may be accomplished such that the set of most-used end-user workflows covers at least a threshold amount of the plurality of captured end-user navigation sessions, as described above.)

According to the techniques herein as detailed above, in step 725 the procedure herein generates one or more synthetic scripts that traverse the one or more particular end-user workflows respectively. Accordingly, in step 730, the procedure may then share the one or more synthetic scripts with a synthetic monitoring system. For instance, the sharing may thus cause the synthetic monitoring system to synthetically test the monitored application using the one or more synthetic scripts to traverse the one or more particular end-user workflows. For example, the synthetic monitoring system may comprise a plurality of distributed synthetic testing agents to synthetically test the monitored application using the one or more synthetic scripts. Alternatively (or additionally), actual end-user agents may be configured to participate in the synthetic testing.

Note that in the event the monitored application is a dynamic application (with user-specific input values), then as mentioned above the techniques herein may filter out the user-specific input values for the one or more synthetic scripts, and may provide, in place of filtered out user-specific input values, one of either a) templates for the synthetic monitoring system to enter test input values for the one or more synthetic scripts or b) actual test input values for the one or more synthetic scripts.

Note further that in specific embodiments herein, as also described above, the one or more particular end-user workflows may correspond to a particular region, and as such, the one or more synthetic scripts may correspond to that particular region and are thus used to synthetically test the monitored application in that particular region.

The simplified procedure 700 may then end in step 735, notably with the ability to continue receiving captured end-user navigation sessions and updating the synthetic scripts. For example, the plurality of captured end-user navigation sessions may correspond to a particular timeframe, and the procedure may further comprise updating the plurality of captured end-user navigation sessions and the one or more synthetic scripts for a new timeframe. Other steps may also be included generally within procedure 700. For example, such steps (or, more generally, such additions to steps already specifically illustrated above), may include: determining previously tested versus untested end-user workflows to select untested end-user workflows for the generated scripts; determining the most-used end-user workflows and ensuring a certain amount of those most-used workflows are being tested; filtering out user-specific input values and replacing them with templates or actual test input values; and so on.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for synthetic web application monitoring based on user navigation patterns. In particular, the techniques herein crowdsource the generation of synthetic path traversal (particularly while not storing and/or using any sensitive data), reducing the effort required to write and maintain scripts, while ensuring that all the key user workflows are monitored. The embodiments herein help observability intelligence platform customers understand how their end users use their applications/webpages, and give the customers information/insights about the availability and performance of the user paths covered by synthetic or proactive monitoring solutions.

Unlike conventional script recording systems, which merely record a test admin's actions to generate a script, the auto-generation of synthetic monitoring scripts herein are based on the aggregation of crowdsourced user events from real user traffic (human actions), and requires no specific knowledge of how an applications is being used by endusers, particularly in different locations of the world. Additionally, the techniques herein provide further insight by locating workflows/paths not previously covered under proactive monitoring, allowing customers to have the benefit of auto-generated tests that do cover such areas of their application (i.e., all critical end-user paths being covered by proactive monitoring herein). Moreover, using the techniques herein, customers do not have to worry about changes in their applications/websites affecting the test results, as location and time-specific changes in the customer's application/website will be automatically factored into any updated scripts that are generated based on new end-user navigation sessions (i.e., using the changed application).

In still further embodiments of the techniques herein, a business impact of the user navigation patterns can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the user navigation patterns (and in particular, metrics associated with the various navigation patterns) with various business transactions in order to better understand the effect on the business transactions, accordingly.

Illustratively, the techniques described herein may be performed by hardware, software, and/or firmware, such as in accordance with the illustrative synthetic script generation process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, a method herein may comprise: receiving, at a device, a plurality of captured end-user navigation sessions for a monitored application; generating, by the device, a mapping of end-user workflows for the monitored application based on an aggregation of the plurality of captured end-user navigation sessions; determining, by the device, one or more particular end-user workflows from the mapping of end-user workflows for synthetic testing; generating, by the device, one or more synthetic scripts that traverse the one or more particular end-user workflows respectively; and sharing, by the device, the one or more synthetic scripts with a synthetic monitoring system to cause the synthetic monitoring system to synthetically test the monitored application using the one or more synthetic scripts to traverse the one or more particular end-user workflows.

In one embodiment, determining the one or more particular end-user workflows comprises: determining, from the mapping of end-user workflows, a set of untested end-user workflows; and selecting the set of untested end-user workflows as the one or more particular end-user workflows.

In one embodiment, determining the one or more particular end-user workflows comprises: determining, from the mapping of end-user workflows, a set of most-used end-user workflows; and selecting the set of most-used end-user workflows as the one or more particular end-user workflows. In one embodiment, the method further comprises: determining the set of most-used end-user workflows such that the set of most-used end-user workflows covers at least a threshold amount of the plurality of captured end-user navigation sessions.

In one embodiment, the one or more particular end-user workflows correspond to a particular region, and wherein the one or more synthetic scripts correspond to the particular region and are used to synthetically test the monitored application in the particular region.

In one embodiment, the plurality of captured end-user navigation sessions correspond to a particular timeframe, and the method further comprises: updating the plurality of captured end-user navigation sessions and the one or more synthetic scripts for a new timeframe.

In one embodiment, the monitored application is a dynamic application with user-specific input values, and the method further comprises: filtering out the user-specific input values for the one or more synthetic scripts. In one embodiment, the method further comprises: providing, in place of filtered out user-specific input values, one of either a) templates for the synthetic monitoring system to enter test input values for the one or more synthetic scripts or b) actual test input values for the one or more synthetic scripts.

In one embodiment, the plurality of captured end-user navigation sessions comprise navigation metadata based on web page elements and actions.

In one embodiment, the plurality of captured end-user navigation sessions comprise actions selected from a group consisting of: clicks; scrolls; double clicks; keydowns; keyups; and text entry.

In one embodiment, the monitored application is selected from a group consisting of: a website; a web application; a mobile application; and a desktop application.

In one embodiment, the method further comprises: receiving the plurality of captured end-user navigation sessions from distributed end-user agents on corresponding end-user web browsers.

In one embodiment, the synthetic monitoring system comprises a plurality of distributed synthetic testing agents to synthetically test the monitored application using the one or more synthetic scripts.

According to the embodiments herein, a tangible, non-transitory, computer-readable medium herein may have computer-executable instructions stored thereon that, when executed by a processor on a computer, may cause the computer to perform a method comprising: receiving a plurality of captured end-user navigation sessions for a monitored application; generating a mapping of end-user workflows for the monitored application based on an aggregation of the plurality of captured end-user navigation sessions; determining one or more particular end-user workflows from the mapping of end-user workflows for synthetic testing; generating one or more synthetic scripts that traverse the one or more particular end-user workflows respectively; and sharing the one or more synthetic scripts with a synthetic monitoring system to cause the synthetic monitoring system to synthetically test the monitored application using the one or more synthetic scripts to traverse the one or more particular end-user workflows.

Further, according to the embodiments herein an apparatus herein may comprise: one or more network interfaces to communicate with a network; a processor coupled to the network interfaces and configured to execute one or more processes; and a memory configured to store a process executable by the processor, the process, when executed, configured to: receive a plurality of captured end-user navigation sessions for a monitored application; generate a mapping of end-user workflows for the monitored application based on an aggregation of the plurality of captured end-user navigation sessions; determine one or more particular end-user workflows from the mapping of end-user workflows for synthetic testing; generate one or more synthetic scripts that traverse the one or more particular end-user workflows respectively; and share the one or more synthetic scripts with a synthetic monitoring system to cause the synthetic monitoring system to synthetically test the monitored application using the one or more synthetic scripts to traverse the one or more particular end-user workflows.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, at a device, a plurality of captured end-user navigation sessions for a monitored application;
generating, by the device, a mapping of end-user workflows for the monitored application based on an aggregation of the plurality of captured end-user navigation sessions;
determining, by the device, one or more particular end-user workflows from the mapping of end-user workflows for synthetic testing;
generating, by the device, one or more synthetic scripts that traverse the one or more particular end-user workflows respectively; and
sharing, by the device, the one or more synthetic scripts with a synthetic monitoring system to cause the synthetic monitoring system to synthetically test the monitored application using the one or more synthetic scripts to traverse the one or more particular end-user workflows.

2. The method as in claim 1, wherein determining the one or more particular end-user workflows comprises:

determining, from the mapping of end-user workflows, a set of untested end-user workflows; and selecting the set of untested end-user workflows as the one or more particular end-user workflows.

3. The method as in claim 1, wherein determining the one or more particular end-user workflows comprises:

determining, from the mapping of end-user workflows, a set of most-used end-user workflows; and selecting the set of most-used end-user workflows as the one or more particular end-user workflows.

4. The method as in claim 3, further comprising:

determining the set of most-used end-user workflows such that the set of most-used end-user workflows covers at least a threshold amount of the plurality of captured end-user navigation sessions.

5. The method as in claim 1, wherein the one or more particular end-user workflows correspond to a particular region, and wherein the one or more synthetic scripts correspond to the particular region and are used to synthetically test the monitored application in the particular region.

6. The method as in claim 1, wherein the plurality of captured end-user navigation sessions correspond to a particular timeframe, the method further comprising:

updating the plurality of captured end-user navigation sessions and the one or more synthetic scripts for a new timeframe.

7. The method as in claim 1, wherein the monitored application is a dynamic application with user-specific input values, the method further comprising:

filtering out the user-specific input values for the one or more synthetic scripts.

8. The method as in claim 7, further comprising:

providing, in place of filtered out user-specific input values, one of either a) templates for the synthetic monitoring system to enter test input values for the one or more synthetic scripts or b) actual test input values for the one or more synthetic scripts.

9. The method as in claim 1, wherein the plurality of captured end-user navigation sessions comprise navigation metadata based on web page elements and actions.

10. The method as in claim 1, wherein the plurality of captured end-user navigation sessions comprise actions selected from a group consisting of: clicks; scrolls; double clicks; keydowns; keyups; and text entry.

11. The method as in claim 1, wherein the monitored application is selected from a group consisting of: a website; a web application; a mobile application; and a desktop application.

12. The method as in claim 1, further comprising:

receiving the plurality of captured end-user navigation sessions from distributed end-user agents on corresponding end-user web browsers.

13. The method as in claim 1, wherein the synthetic monitoring system comprises a plurality of distributed synthetic testing agents to synthetically test the monitored application using the one or more synthetic scripts.

14. A tangible, non-transitory, computer-readable medium having computer-executable instructions stored thereon that, when executed by a processor on a computer, cause the computer to perform a method comprising:

receiving a plurality of captured end-user navigation sessions for a monitored application;

generating a mapping of end-user workflows for the monitored application based on an aggregation of the plurality of captured end-user navigation sessions;

determining one or more particular end-user workflows from the mapping of end-user workflows for synthetic testing;

generating one or more synthetic scripts that traverse the one or more particular end-user workflows respectively; and sharing the one or more synthetic scripts with a synthetic monitoring system to cause the synthetic monitoring system to synthetically test the monitored application using the one or more synthetic scripts to traverse the one or more particular end-user workflows.

15. The computer-readable medium as in claim 14, wherein determining the one or more particular end-user workflows further comprises:

determining, from the mapping of end-user workflows, a set of untested end-user workflows; and selecting the set of untested end-user workflows as the one or more particular end-user workflows.

16. The computer-readable medium as in claim 14, wherein determining the one or more particular end-user workflows further comprises:

determining, from the mapping of end-user workflows, a set of most-used end-user workflows; and selecting the set of most-used end-user workflows as the one or more particular end-user workflows.

17. The computer-readable medium as in claim 14, wherein the one or more particular end-user workflows correspond to a particular region, and wherein the one or more synthetic scripts correspond to the particular region and are used to synthetically test the monitored application in the particular region.

18. The computer-readable medium as in claim 14, wherein the plurality of captured end-user navigation sessions correspond to a particular timeframe, and wherein the method further comprises:

updating the plurality of captured end-user navigation sessions and the one or more synthetic scripts for a new timeframe.

19. The computer-readable medium as in claim 14, wherein the monitored application is a dynamic application with user-specific input values, and wherein the method further comprises:

filtering out the user-specific input values for the one or more synthetic scripts.

20. An apparatus, comprising:

one or more network interfaces to communicate with a network;

a processor coupled to the network interfaces and configured to execute one or more processes; and a memory configured to store a process that is executable by the processor, the process, when executed, configured to:

receive a plurality of captured end-user navigation sessions for a monitored application;

generate a mapping of end-user workflows for the monitored application based on an aggregation of the plurality of captured end-user navigation sessions;

determine one or more particular end-user workflows from the mapping of end-user workflows for synthetic testing;

generate one or more synthetic scripts that traverse the one or more particular end-user workflows respectively; and share the one or more synthetic scripts with a synthetic monitoring system to cause the synthetic monitoring system to synthetically test the monitored application using the one or more synthetic scripts to traverse the one or more particular end-user workflows.

\* \* \* \* \*